United States Patent
Shirane

(10) Patent No.: US 8,252,447 B2
(45) Date of Patent: Aug. 28, 2012

(54) PORTABLE POWER SOURCE AND PORTABLE POWER SOURCE SYSTEM

(75) Inventor: Takayuki Shirane, Moriguchi (JP)

(73) Assignee: Panasonic Corporation, Osaka (JP)

( * ) Notice: Subject to any disclaimer, the term of this patent is extended or adjusted under 35 U.S.C. 154(b) by 904 days.

(21) Appl. No.: 10/558,675

(22) PCT Filed: Jan. 5, 2005

(86) PCT No.: PCT/JP2005/000010
§ 371 (c)(1),
(2), (4) Date: Nov. 30, 2005

(87) PCT Pub. No.: WO2005/069407
PCT Pub. Date: Jul. 28, 2005

(65) Prior Publication Data
US 2006/0275655 A1 Dec. 7, 2006

(30) Foreign Application Priority Data
Jan. 15, 2004 (JP) ................. 2004-007701

(51) Int. Cl.
*H01M 6/00* (2006.01)
*H01M 10/00* (2006.01)
*H01M 10/38* (2006.01)
*H01M 6/16* (2006.01)
(52) U.S. Cl. ......... 429/123; 429/122; 429/333; 429/337
(58) Field of Classification Search ............. 429/96, 429/97, 121; 439/333, 337, 772, 773
See application file for complete search history.

(56) References Cited

U.S. PATENT DOCUMENTS
3,864,172 A * 2/1975 Marks ............................... 429/1
(Continued)

FOREIGN PATENT DOCUMENTS
JP        05-028983        2/1993
(Continued)

OTHER PUBLICATIONS

European Search Report issued in European Patent Application No. EP 05703288.0-2119/1705733 dated Jul. 10, 2008.

(Continued)

*Primary Examiner* — Barbara Gilliam
*Assistant Examiner* — Steven Scully
(74) *Attorney, Agent, or Firm* — McDermott Will & Emery LLP

(57) ABSTRACT

A portable power source system including a battery pack housing at least one secondary battery, wherein first and second internal terminals for connecting to a pair of external terminals are provided inside the battery pack, and two or more operations in different operating directions are required to connect the external terminals to the internal terminals. The battery pack includes external terminal inserting portions for inserting the external terminals, and the two or more operations include a first operation including inserting the external terminals into the external terminal inserting portions and a second operation in a direction different from that of the first operation. In a state before the first operation is performed, at least one of the internal terminals is shielded with a protective cover, and the protective cover recedes from a position for shielding the internal terminal, in conjunction with the first operation, the second operation or a combination of the first operation and the second operation, thereby enabling a connection of the external terminals to the internal terminals.

4 Claims, 2 Drawing Sheets

U.S. PATENT DOCUMENTS

| | | | | |
|---|---|---|---|---|
| 3,971,619 A | * | 7/1976 | Rohrssen | 439/102 |
| 4,725,245 A | * | 2/1988 | Shea | 439/312 |
| 5,589,295 A | * | 12/1996 | Derzon et al. | 429/303 |
| 5,612,659 A | | 3/1997 | Kerber | |
| 5,751,546 A | * | 5/1998 | Clark et al. | 361/686 |

FOREIGN PATENT DOCUMENTS

| | | | |
|---|---|---|---|
| JP | 09-106801 | | 4/1997 |
| JP | 09-320554 | | 12/1997 |
| JP | 2001-057204 | | 2/2001 |
| JP | 2002-124230 | * | 4/2002 |
| JP | 2003-151525 | | 5/2003 |

OTHER PUBLICATIONS

United States Office Action issued in U.S. Appl. No. 12/244,456 dated Aug. 7, 2009.

United States Office Action issued in U.S. Appl. No. 12/244,456 dated Dec. 15, 2009.

* cited by examiner

PORTABLE POWER SOURCE AND PORTABLE POWER SOURCE SYSTEM

RELATED APPLICATION

This application is the U.S. National Phase under 35 U.S.C. §371 of International Application No. PCT/JP2005/000010, filed Jan. 5, 2005, which in turn claims the benefit of Japanese Application No. 2004-007701, filed Jan. 15, 2004, the disclosures of which Applications are incorporated by reference herein in their entirety.

TECHNICAL FIELD

The present invention relates to a portable power source and a portable power source system that include a battery pack, and more particularly to a terminal structure of a battery pack.

BACKGROUND ART

Recently, cordless or portable applications have been increasingly realized also for equipment such as electric tools, and there is an increasing demand for portable power source systems. While electric tools such as an electric screwdriver are widely used for business purposes in construction sites and the like since they can dramatically improve working efficiency, they are also sold at places like home improvement stores and coming into use for the purpose of do-it-yourself and the like.

Although nickel-cadmium batteries, nickel-metal hydride batteries and the like are mainly used as the power sources for equipment such as electric tools that have been adapted to use in cordless applications, these batteries have a heavy weight, and therefore the use of lithium ion secondary batteries, which are lightweight, has been attempted lately. In addition to being lightweight, lithium ion secondary batteries have a discharge voltage per battery that is about three times as high as that of nickel-cadmium batteries or nickel-metal hydride batteries, and thus are advantageous in applications requiring high output.

Lithium ion secondary batteries, however, may not be able to maintain the battery performance such as the cycle life if the charge/discharge conditions are not controlled appropriately. When they are discharged under a special condition, including, for example, a case in which the positive terminal and the negative terminal are short-circuited, the battery performance may be significantly impaired.

In portable power source systems used in electric tools and the like, as the connecting mechanism between a battery pack and a mounting portion for mounting that battery pack, those of the inserting type or the sliding type have been commonly used. However, a pair of connection terminals included in the battery pack is often exposed to the outside. In addition, in the case of electric tools used for business purposes, it is often the case that a plurality of battery packs are prepared in advance and these are replaced for use, in order to improve the working efficiency. In such a case, it is conceivable that a battery pack having terminals that are exposed to the outside thereof are placed in a tool box. In the tool box, metallic tools or parts such as nails or screws may be placed, or the tool box itself may be made of metal. Due to such external factors, there is the possibility that short circuit may occur between the terminals of the battery pack.

when the terminals of the battery pack are exposed to the outside, there is also the possibility that charging may be performed with a power source other than a dedicated charger. Also in such a case, the charge conditions cannot be controlled appropriately, so that there is the possibility that the battery performance may be significantly impaired.

There is a technique that proposes to cover the terminals with a cover in a portable power source system, except for when the battery pack is connected to a dedicated charger or equipment, from the viewpoint of obviating the problems as described above (see Japanese Unexamined Patent Publication No. Hei 9-320554). In this case, short circuit will not occur unless lead wires or the like are intentionally connected to the terminals; however, short circuit or the like cannot be sufficiently prevented since the terminals are exposed in a state where the cover is released.

There is also proposed a technique by which the terminals are provided inside the battery pack, rather than being exposed to the outside, thereby preventing short circuit (see Japanese Unexamined Patent Publication No. 2001-57204). However, by simply inserting off-specification lead wires or the like into external terminal inserting portions, the lead wires or the like can be connected to the terminals, so that the possibility of charging/discharging of the battery under inappropriate conditions has not been totally eliminated.

DISCLOSURE OF INVENTION

It is a major object of the present invention to prevent short circuit between the terminals of a battery pack in a portable power source and a portable power source system, while preventing charging with a power source other than a dedicated charger, thereby avoiding charging/discharging of the battery under inappropriate conditions. It is also an object of the present invention to provide a portable power source system that allows an easy connection between dedicated equipment or charger and a battery pack.

The present invention relates to a portable power source comprising a battery pack housing at least one secondary battery, wherein the battery pack includes external terminal inserting portions for inserting a pair of external terminals, a first internal terminal and a second internal terminal for connecting to the pair of external terminals are provided inside the battery pack, and two or more operations in different operating directions are required to connect the pair of external terminals to the first internal terminal and the second internal terminal.

The present invention also relates to a portable power source system comprising a battery pack housing at least one secondary battery and a mounting portion for mounting the battery pack, wherein the mounting portion includes a pair of external terminals, the battery pack includes external terminal inserting portions for inserting the pair of external terminals, a first internal terminal and a second internal terminal for connecting to the pair of external terminals are provided inside the battery pack, and two or more operations in different operating directions are required to connect the pair of external terminals to the first internal terminal and the second internal terminal.

The present invention further relates to a portable power source system comprising a battery pack housing at least one secondary battery and a mounting portion for mounting the battery pack, wherein the mounting portion includes a pair of external terminals, the battery pack includes external terminal inserting portions for inserting the pair of external terminals, a first internal terminal and a second internal terminal for connecting to the pair of external terminals are provided inside the battery pack, the first internal terminal and the second internal terminal are provided in positions that are in a space communicating with the external terminal inserting portions and that are displaced from given straight lines in an inserting direction in the external terminal inserting portions, the pair of external terminals are movable from an initial position to a fixing position, while being inserted into the external terminal inserting portions, and a connection of the pair of external terminals to the first internal terminal and the second internal terminal is established in the fixing position.

The portable power source of the present invention may be provided with, for example, a protective cover for preventing short circuit and a remaining capacity display means. It should be noted that the battery pack may include, in addition to the secondary battery, a cabinet for housing the secondary battery, a protection circuit on charge for the secondary battery, a protection circuit on discharge for the secondary battery, a thermistor and a thermal fuse, for example.

As described above, the portable power source system of the present invention includes at least a battery pack and a mounting portion for mounting that battery pack. Furthermore, when the mounting portion is included in equipment that uses the battery pack as its power source or a charger, the portable power source system includes that equipment or charger. Examples of the equipment including a mounting portion for mounting a battery pack include, but not limited to, an electric tool, an electric vacuum cleaner, an electric bicycle and an electric motorbike.

In the portable power source and the portable power source system of the present invention, one of the pair of external terminals is connected to one of the first internal terminal and the second internal terminal, and the other of the pair of external terminals is connected to the other of the first internal terminal and the second internal terminal. One of the first internal terminal and the second internal terminal constitutes a positive (+) terminal, and the other constitutes a negative (−) terminal. That is, one of the first internal terminal and the second internal terminal is connected to the positive electrode terminal of the secondary battery, and the other is connected to the negative electrode terminal of the secondary battery.

Ordinarily, the first internal terminal and the second internal terminal are provided in concealed positions that are other than the outermost surface of the cabinet surrounding the secondary battery and that communicate with the external terminal inserting portions. Furthermore, the first internal terminal and the second internal terminal are provided in positions that are displaced from straight lines in the inserting direction in the external terminal inserting portions provided in the battery pack. Accordingly, two or more operations in different operating directions are required to connect the pair of the external terminals to the first internal terminal and the second internal terminal.

The two or more operations in different operating direction includes, for example, a first operation including inserting the pair of external terminals into the external terminal inserting portions and a second operation in a direction different from that of the first operation. In this case, a connection of the pair of external terminals to the first internal terminal and the second internal terminal is not established by the first operation, and a connection of the pair of external terminals to the first internal terminal and the second internal terminal is established by the second operation. A system in which two operations are required in this manner is also referred to as a "double action system".

For example, in the case of mounting a battery pack to a mounting portion of predetermined equipment or a predetermined charger, the first operation includes inserting the pair of external terminals included in the mounting portion into the external terminal inserting portion of the battery pack. Further, the second operation includes, for example, sliding in a direction orthogonal to the direction of the first operation, or rotation about the inserting direction as the rotation axis.

In a preferred embodiment of the present invention, in a state before the first operation is performed, at least one of the first internal terminal and the second internal terminal is shielded with a protective cover. The protective cover prevents contacts of the internal terminals with components other than predetermined external terminals to which the internal terminals are to be connected. The protective cover may have a shape covering at least a portion of the internal terminal(s), a shape shielding at least a portion of the traveling path of the external terminal(s), or a shape other than these. There is also no particular limitation with respect to the extent to which the protective cover shields the internal terminal(s).

The protective cover needs to recede from the position for shielding the internal terminal(s), in conjunction with the first operation, the second operation or a combination of the first operation and the second operation. As a result, it is possible to establish a connection of the pair of external terminals to the first internal terminal and the second internal terminal. For example, it is possible to adopt such a system in which, by the first operation including inserting the pair of external terminals into the external terminal inserting portions, the protective cover is pushed away in the inserting direction by the external terminals.

When the first operation and the second operation constitute an operation of mounting the battery pack to predetermined equipment or a predetermined charger, it is preferable that a battery pack mounting portion included in the predetermined equipment or predetermined charger includes a cover releasing element for causing the protective cover to recede from a position for shielding the internal terminals, in conjunction with the first operation, the second operation or a combination of the first operation and the second operation. Examples of the cover releasing element include those having a protruding shape and playing the role together with the external terminals of pushing the protective cover away in the inserting direction in the first operation.

The present invention is particularly effective when the secondary battery included in the battery pack is a lithium ion secondary battery. The reason is that a lithium ion secondary battery is particularly vulnerable to overcharge, and therefore requires a highly protective function.

In the portable power source and the portable power source system according to the present invention, the terminals of the battery pack are not exposed to the outside, so that short circuit will not easily occur between the terminals of the battery pack. Therefore, the present invention is particularly effective for a portable power source and a portable power source system that include a battery pack for an electric tools for which there is a high possibility of short circuit between the terminals.

Furthermore, since two or more operations in different operating directions are required to connect the external terminals to the internal terminals in the portable power source and the portable power source system of the present invention, off-specification lead wires or the like cannot be connected to the terminals of the battery pack even when such lead wires or the like are inserted into the external terminal inserting portions, unless an operation in a direction different from that of the insertion is performed. Accordingly, it is possible to avoid charging/discharging of the battery under inappropriate conditions, and the battery characteristics will not be paired significantly.

Moreover, when two or more operations in different operating directions are required to connect the external terminals to the internal terminals, it is difficult to establish the connection if the shape and the position in the mounting portion of the external terminals do not correspond to the shape and the position inside the battery pack of the internal terminals. Accordingly, it is extremely difficult to connect the battery pack to equipment other than predetermined equipment or a predetermined charger, making it possible to obviating troubles that could result from misuse of the power source system.

When including a protective cover, the portable power source and the portable power source system of the present invention can more reliably prevent short circuit between the terminals of the battery pack and a connection of the terminals of the battery pack to off-specification lead wires or the like. For example, even when an attempt is made to intentionally connect off-specification lead wires or the like to the internal terminals of the battery pack, a contact of the lead wires with the internal terminals can be prevented unless the protective cover is receded, since the internal terminals are shielded with the protective cover.

Further, when the portable power source and the portable power source system include a protective cover, the protective cover must be receded in order to establish a connection of the internal terminals to the external terminals, in addition to that two or more operations in different operating directions are required. Accordingly, it is extremely difficult to connect the battery pack to equipment other than predetermined equipment or a predetermined charger, and such a connection can be prevented more reliably.

Furthermore, in the portable power source system of the present invention, it is possible to establish a connection between the battery pack and predetermined equipment or a predetermined charger in a very simple manner.

It should be noted that when there is the possibility that short circuit may occur between the terminals of the battery pack, or that the terminals of the battery pack may be connected to a power source other than a predetermined charger, the battery pack needs to include a protection circuit on charge and discharge of the lithium ion secondary battery.

A protection circuit on charge including a current regulating device is required during charging, since there is the possibility that the battery performance may be significantly impaired if charging is not performed with controlled maximum voltage and controlled current value. On the other hand, a protection circuit on discharge including a current regulating device is required during discharging in order to prevent a large amount of current flowing through the discharge circuit and an extreme decrease in the battery voltage in the case where short circuit occurs between the terminals of the battery pack and where the terminals of the battery pack are connected to equipment other than predetermined equipment.

On the other hand, when there is no possibility that the terminals of the battery pack will be connected to a power source other than a predetermined charger, the current regulating device of the protection circuit on discharge may be omitted, for such reasons that a large current required by specific equipment is temporarily allowed to flow during discharging, and that the total amount of the discharge current is regulated by the capacity of the secondary battery. Accordingly, with the present invention, it is also possible to reduce the manufacturing cost for battery packs.

BEST MODE FOR CARRYING OUT THE INVENTION

In this embodiment, a description is given, with reference to the drawings, of a portable power source and a portable power source system that have a double action system in which a first operation of inserting external terminals into external terminal inserting portions of a battery pack is performed, and thereafter a second operation of rotation about the inserting direction as the rotation axis is performed.

Figure 1:
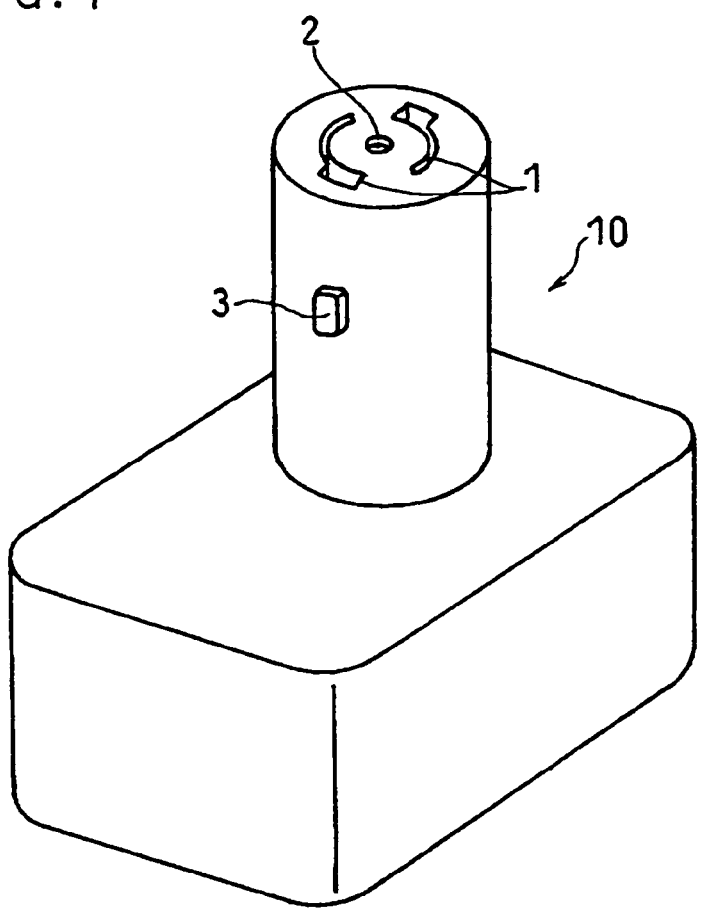
FIG. 1 is a perspective view of a battery pack according to one embodiment of the present invention.
Figure 2:
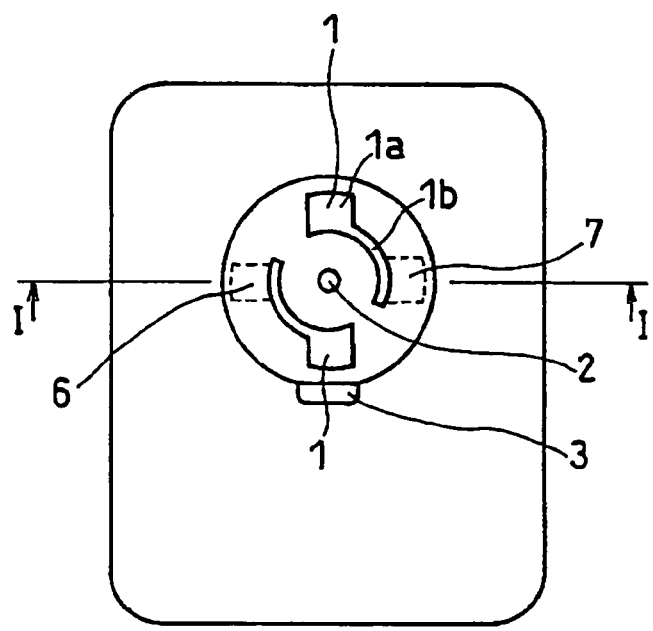
FIG. 2 is a top view of the battery pack according to the embodiment of the present invention.
Figure 3:
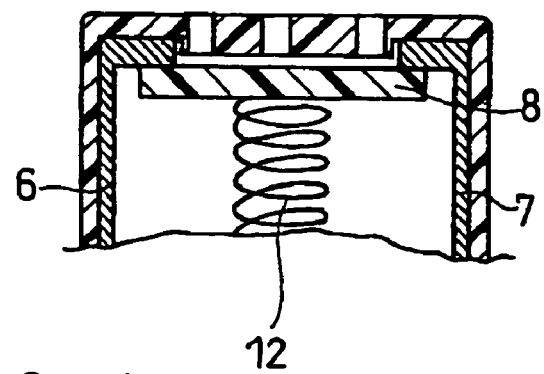
FIG. 3 is a cross-sectional view of a relevant part of the battery pack according to the embodiment of the present invention, showing a state in which a pair of external terminals are not connected to a first internal terminal and a second internal terminal of the battery pack.
Figure 4:
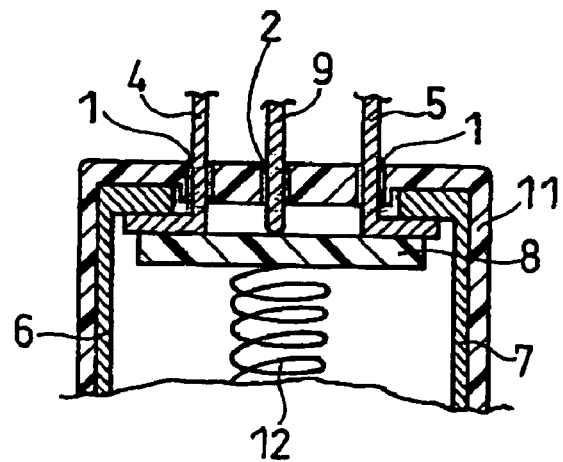
FIG. 4 is a cross-sectional view of a relevant part of the battery pack according to the embodiment of the present invention, showing a state in which the pair of external terminals are connected to the first internal terminal and the second internal terminal of the battery pack.

FIG. 1 is a perspective view of a battery pack 10 according to this embodiment, and FIG. 2 is a top view thereof. FIG. 3 and FIG. 4 are cross-sectional views of relevant parts of the battery pack 10 according to this embodiment, respectively showing an unconnected state and a connected state between a pair of external terminals 4 and 5 and a first internal terminal 6 and a second internal terminal 7 of the battery pack. FIG. 4 corresponds to a relevant part of a cross-sectional view taken on the line I-I in FIG. 2. In this embodiment, the battery pack 10 per se constitutes a portable power source. Further, the battery pack 10 and the pair of external terminals 4 and 5, which are included in a mounting portion (not shown) for mounting the battery pack 10, constitute a portable power source system.

At least one secondary battery (not shown) is housed inside the battery pack 10. A cabinet tube portion 11 constituting the battery pack 10 includes, at its top, external terminal inserting portions 1 for inserting the pair of external terminals 4 and 5, and an element inserting portion 2 for inserting a cover releasing element 9. The external terminal inserting portions 1 include wider width portions 1a into which the external terminals 4 and 5 are inserted in the first operation, and slit portions 1b formed in an arch shape communicating with the wider width portions 1a. The element inserting portion 2 is a circular through hole.

A protruding portion constituting a guide 3 is provided on the side face of the cabinet tube portion 11. When the battery pack 10 is mounted to a predetermined mounting portion, the guide 3 moves along a groove formed in the mounting portion. The guide 3 plays the role of positioning the battery pack 10 and the mounting portion in the first operation and the second operation, which constitute mounting of the battery pack 10 to the mounting portion.

In the first operation, the external teals 4 and 5 are inserted into the wider width portions 1a of the external terminal inserting portions 1. The external terminals 4 and 5 have L-shaped tips. Additionally, in the first operation, the rod-shaped cover releasing element 9 is inserted into the element inserting portion 2, concurrently with the insertion of the external terminals 4 and 5. By the insertion of the external terminals 4 and 5 and the cover releasing element 9, a diskshaped, movable protective cover 8 made of resin is depressed. That is, in a state before the first operation is performed, the protective cover 8 is pushed upward by the force of a spring 12, and the first internal terminal 6 and the second internal terminal 7 are covered and shielded with the peripheral portion of the protective cover 8. The protective cover 8 recedes from the position for shielding the first internal terminal 6 and the second internal terminal 7, in conjunction with the first operation.

In the subsequent second operation including rotation, the external terminals 4 and 5 move along the slit portions 1b. In FIG. 2, the external terminals rotate clockwise. In the end position of the second operation, the first internal terminal 6 and the second internal terminal 7 are disposed facing the L-shaped tips of the external terminals 4 and 5, and the connection of the external terminals 4 and 5 to the first internal terminal 6 and the second internal terminal 7 is established in that position. The first internal terminal 6 and the second internal terminal 7 are respectively connected to one and the other of the positive electrode terminal and the negative electrode terminal of the secondary battery housed inside the battery pack 10.

By controlling, for example, the material of the protective cover 8, the position and the shape of the cover releasing element 9 and the strength of the spring 12, it is also possible to allow the protective cover 8 to recede only when the connection is made to the external terminals included in predetermined equipment or charger.

After the connection of the external terminals 4 and 5 to the first internal terminal 6 and the second internal terminal 7 has been established, the protective cover 8 is pushed upward by the spring 12, and thus plays the role of further strengthening the connection between the external terminals 4 and 5 and the first internal terminal 6 and the second internal terminal 7.

In the portable power source and the portable power source system of this embodiment, the first internal terminal 6 and the second internal terminal 7 of the battery pack 10 are not exposed to the outside, so that short circuit will not easily occur between the terminals of the battery pack 10. Furthermore, since the first operation including inserting the external terminals 4 and 5 into the external terminal inserting portions 1 and the second operation including rotation are required to connect the external terminals 4 and 5 to the first internal terminal 6 and the second internal terminal 7, even when off-specification lead wires or the like are inserted into the external terminal inserting portions 1, those lead wires or the like cannot be connected to the first internal terminal 6 and the second internal terminal 7.

Furthermore, since it is difficult to establish a connection if the shape and the positions in the mounting portion of the external terminals do not correspond to the shape and the positions inside the battery pack 10 of the first internal terminal 6 and the second internal terminal 7, it is extremely difficult to connect the battery pack 10 to equipment other than predetermined equipment or a predetermined charger.

Moreover, since the battery pack 10 is provided with the protective cover 8, short circuit between the first internal terminal 6 and the second internal terminal 7, as well as a connection of the first internal terminal 6 and the second internal terminal 7 to off-specification lead wires or the like, can be effectively avoided, and moreover, it is extremely difficult to connect the battery pack 10 to equipment other than predetermined equipment or a predetermined charger.

Figure 5:
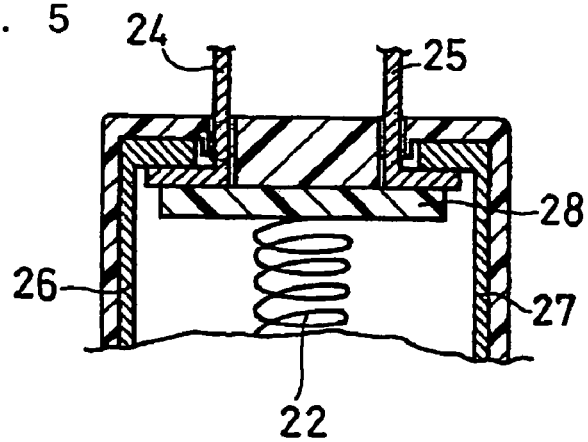
FIG. 5 is a cross-sectional view of a relevant part of a battery pack according to another embodiment of the present invention, showing a state in which a pair of external terminals are connected to a first internal terminal and a second internal terminal of the battery pack.

Additionally, while it is preferable that the battery pack 10 is provided with the movable protective cover 8 made of resin, the protective cover is not essential. FIG. 5 shows a cross-sectional view showing a relevant part of a battery pack 20, which has a structure similar to that of the above-described embodiment, except for not including the movable protective cover, but including a fixed shield plate 28 instead. FIG. 5 shows a connected state between a pair of external terminals 24 and 25 and a first internal terminal 26 and a second internal terminal 27 of the battery pack 20.

Also in the embodiment of FIG. 5, after the connection of the external terminals 24 and 25 to the first internal terminal 26 and the second internal terminal 27 has been established, the shield plate 28 is pushed upward by a spring 22, so that it is possible to strengthen the connection between the external terminals 24 and 25 and the first internal terminal 26 and the second internal terminal 27.

INDUSTRIAL APPLICABILITY

The portable power source and the portable power source system according to the present invention are useful in applications for which it is desired that short circuit between the terminals of the battery pack during storage and the misuse are prevented, and are useful as a portable power source and a portable power source system for use in, for example, an electric tool, an electric vacuum cleaner, an electric bicycle and an electric motorbike.

The invention claimed is:

1. A portable power source comprising a battery pack housing at least one secondary battery,
wherein said battery pack includes an electrically insulative cabinet, said cabinet including a positive external terminal inserting portion for inserting a positive external terminal, and a negative external terminal inserting portion for inserting a negative external terminal,
provided inside of said cabinet so as not to be exposed outside said cabinet are a positive internal terminal and a negative internal terminal for connecting to said positive external terminal and said negative external terminal, respectively,
further provided inside of said cabinet, are: a movable protective cover facing said positive internal terminal, said negative internal terminal, said positive external terminal inserting portion and said negative external terminal inserting portion; and an elastic member for biasing said protective cover toward said positive internal terminal and said negative internal terminal,
two or more operations in different operating directions are required to connect said positive external terminal and said negative external terminal to said positive internal terminal and said negative internal terminal, respectively,
said two or more operations comprising:
a first operation including inserting said positive external terminal and said negative external terminal into said positive external terminal inserting portion and said negative external terminal inserting portion, respectively, so that said positive external terminal and said negative external terminal abut to said protective cover, thereby causing said protective cover to go against the biasing force of said elastic member and to thus separate from said positive internal terminal and said negative internal terminal; and
a second operation including rotation having a rotational axis in the direction of said first operation,
said positive external terminal inserting portion has: a first wider width portion into which said positive external terminal is inserted in said first operation; and a first slit portion, formed the manner of communicating with said first wider width portion, along which said positive external terminal moves in said second operation, said negative external terminal inserting portion has: a second wider width portion into which said negative external terminal is inserted in said first operation; and a second slit portion formed in the manner of communicating with said second wider width portion, along which said negative external terminal moves in said second operation, said positive internal terminal is provided on an end portion of said first slit portion opposite an end portion thereof where said first wider width portion is positioned; and said negative internal terminal is provided on an end portion of said second slit portion opposite an end portion thereof where said second wider width portion is positioned, a connection between said positive external terminal and said positive internal terminal and a connection between said negative external terminal and said negative internal terminal are both not yet established in said first operation, a connection between said positive external terminal and said positive internal terminal and a connection between said negative external terminal and said negative internal terminal are both established in said second operation, and at end positions in said second operation, said positive external terminal and said negative external terminal are pressed to said positive internal terminal and said negative internal terminal, respectively, by the biasing force of said elastic member, via said protective cover.

2. The portable power source in accordance with claim 1, wherein said secondary battery is a lithium ion secondary battery.

3. The portable power source in accordance with claim 1, wherein when said two or more operations in different operating directions are completed, said positive external terminal and said negative external terminal are simultaneously and electrically connected to said positive internal terminal and said negative internal terminal, respectively.

4. A portable power source comprising a battery pack housing at least one secondary battery, wherein said battery pack includes an electrically insulative cabinet, said cabinet having a cabinet tube portion, said cabinet tube portion includes, at a top thereof, a positive external terminal inserting portion for inserting a positive external terminal, and a negative external terminal inserting portion for inserting a negative external terminal, said positive external terminal inserting portion has a first wider width portion, and a first slit portion formed in an arch shape for communicating with said first wider width portion; and said negative external terminal inserting portion has a second wider width portion, and a second slit portion formed in an arch shape for communicating with said second wider width portion, provided inside said cabinet tube portion and behind said top thereof, are a positive internal terminal and a negative internal terminal for connecting to said positive external terminal and said negative external terminal, respectively, said positive internal terminal is provided on an end portion of said first slit portion opposite an end portion thereof where said first wider width portion is positioned; and said negative internal terminal is provided on an end portion of said second slit portion opposite an end portion thereof where said second wider width portion is positioned, provided inside said cabinet tube portion is a movable protective cover for shielding said positive internal terminal and said negative internal terminal, said cabinet tube portion has, at said top thereof, an element inserting portion for inserting a cover releasing element, said movable protective cover is brought into contact with the inner wall of said cabinet by the elastic force of a spring from inside said cabinet tube portion, two or more operations in different operating directions are required to connect said positive external terminal and said negative external terminal to said positive internal terminal and said negative internal terminal, respectively, said two or more operations including at least a rotational movement, said two or more operations comprising:

a first operation including: passing said positive external terminal and said negative external terminal through said first wider width portion and said second wider width portion, respectively, for insertions into said positive external terminal inserting portion and said negative external terminal inserting portion, respectively; and inserting said cover releasing element into said element inserting portion so that said cover releasing element abuts to said protective cover thereby causing said protective cover to go against the elastic force of said spring and to thus separate from said positive internal terminal and said negative internal terminal; and a second operation including rotation having a rotational axis in the direction of said first operation, a connection between said positive external terminal and said positive internal terminal and a connection between said negative external terminal and said negative internal terminal are both not yet established in the first operation, and a connection between said positive external terminal and said positive internal terminal and a connection between said negative external terminal and said negative internal terminal are both established in the second operation, and at end positions in said second operation, said positive external terminal and said external terminal are pressed to said positive internal terminal and said negative internal terminal, respectively, by the elastic force of said spring via said protective cover.

* * * * *